(12) United States Patent
Sarda

(10) Patent No.: US 8,424,940 B2
(45) Date of Patent: Apr. 23, 2013

(54) RESILIENT CLAMP FOR HOLDING A CONTAINER BY THE NECK

(75) Inventor: Eric Sarda, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 12/934,455

(22) PCT Filed: Mar. 26, 2008

(86) PCT No.: PCT/IB2008/001239
§ 371 (c)(1),
(2), (4) Date: Dec. 15, 2010

(87) PCT Pub. No.: WO2009/118579
PCT Pub. Date: Oct. 1, 2009

(65) Prior Publication Data
US 2011/0109110 A1  May 12, 2011

(51) Int. Cl.
*B65G 47/86* (2006.01)
*B65G 47/74* (2006.01)
*B25J 15/00* (2006.01)
*B67C 3/24* (2006.01)

(52) U.S. Cl.
USPC .......................................... 294/99.1; 294/90

(58) Field of Classification Search .................. 294/99.1, 294/90, 96, 106, 196, 198, 203; 198/803.1, 198/803.3, 803.4, 803.8, 803.9; 414/225.01, 414/226.02; 425/534
See application file for complete search history.

(56) References Cited

U.S. PATENT DOCUMENTS

| | | | |
|---|---|---|---|
| 4,509,784 A * | 4/1985 | Vollers | 294/99.1 |
| 4,858,980 A | 8/1989 | Dreisig et al. | |
| 8,002,106 B2 * | 8/2011 | Preti et al. | 198/459.2 |

FOREIGN PATENT DOCUMENTS

| | | | |
|---|---|---|---|
| DE | 20 2006 004641 U1 | | 8/2007 |
| DE | 102008019766 | * | 4/2009 |
| EP | 1 867 600 A1 | | 12/2007 |
| JP | 2001-287795 A | | 10/2001 |

* cited by examiner

Primary Examiner — Paul T Chin
(74) Attorney, Agent, or Firm — Sughrue Mion, PLLC

(57) ABSTRACT

Clamp (1) for holding a container (2) by a neck (3) in a container handling machine (5), said clamp comprising a body (7) for mounting the clamp (1) on a rotary support (4), and a pair of resilient arms (11) protruding sidewise from the body (7) and each provided with a gripping jaw (12), wherein each resilient arm (11) comprises:
- an inner section (13) extending along the body (7) and connected thereto at a first back end junction (16);
- an intermediate section (14) extending substantially parallel to the inner section (13) and connected thereto at a front end junction (17);
- an outer section (15), provided, at a front end, with a gripping jaw (12), and extending substantially parallel to the intermediate section (14) and connected thereto at a second back end junction (18).

18 Claims, 10 Drawing Sheets

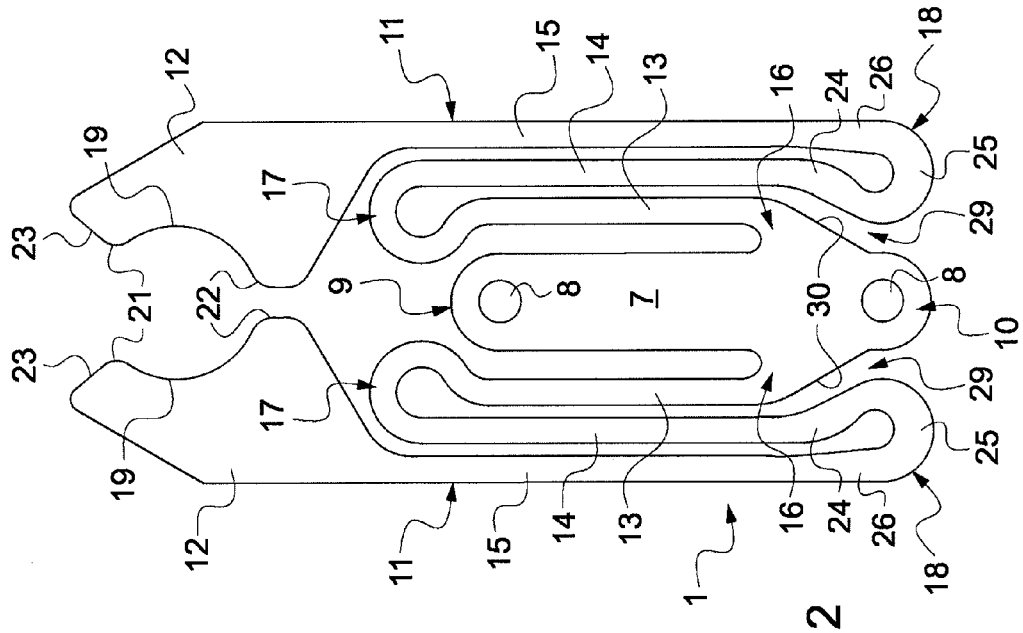
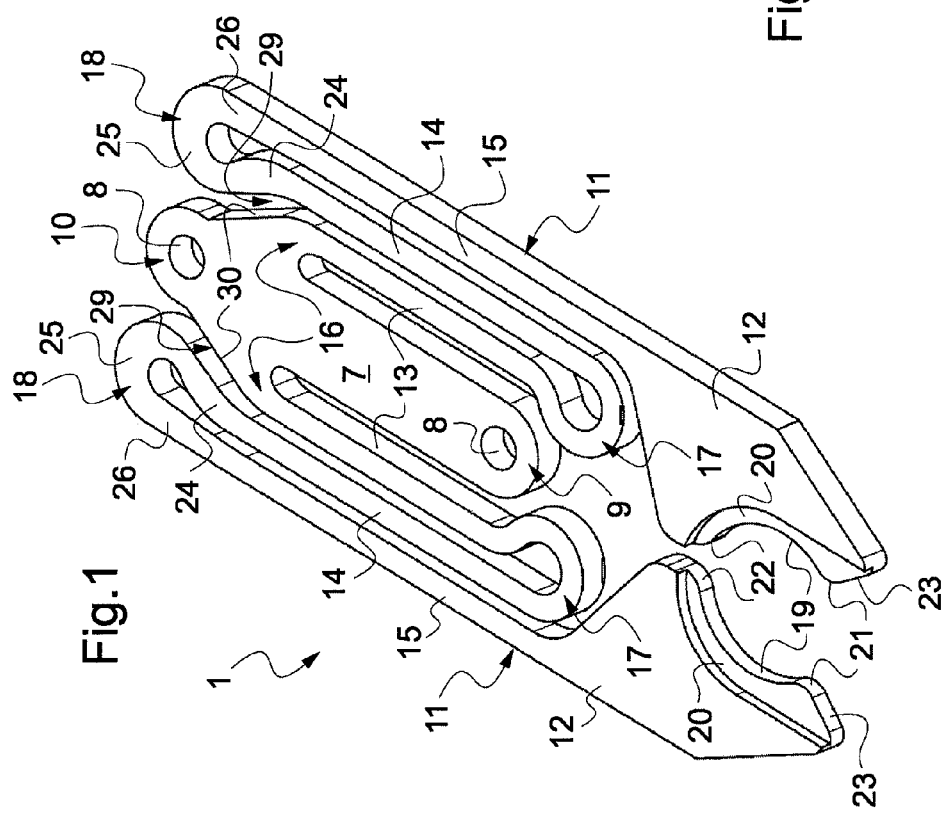

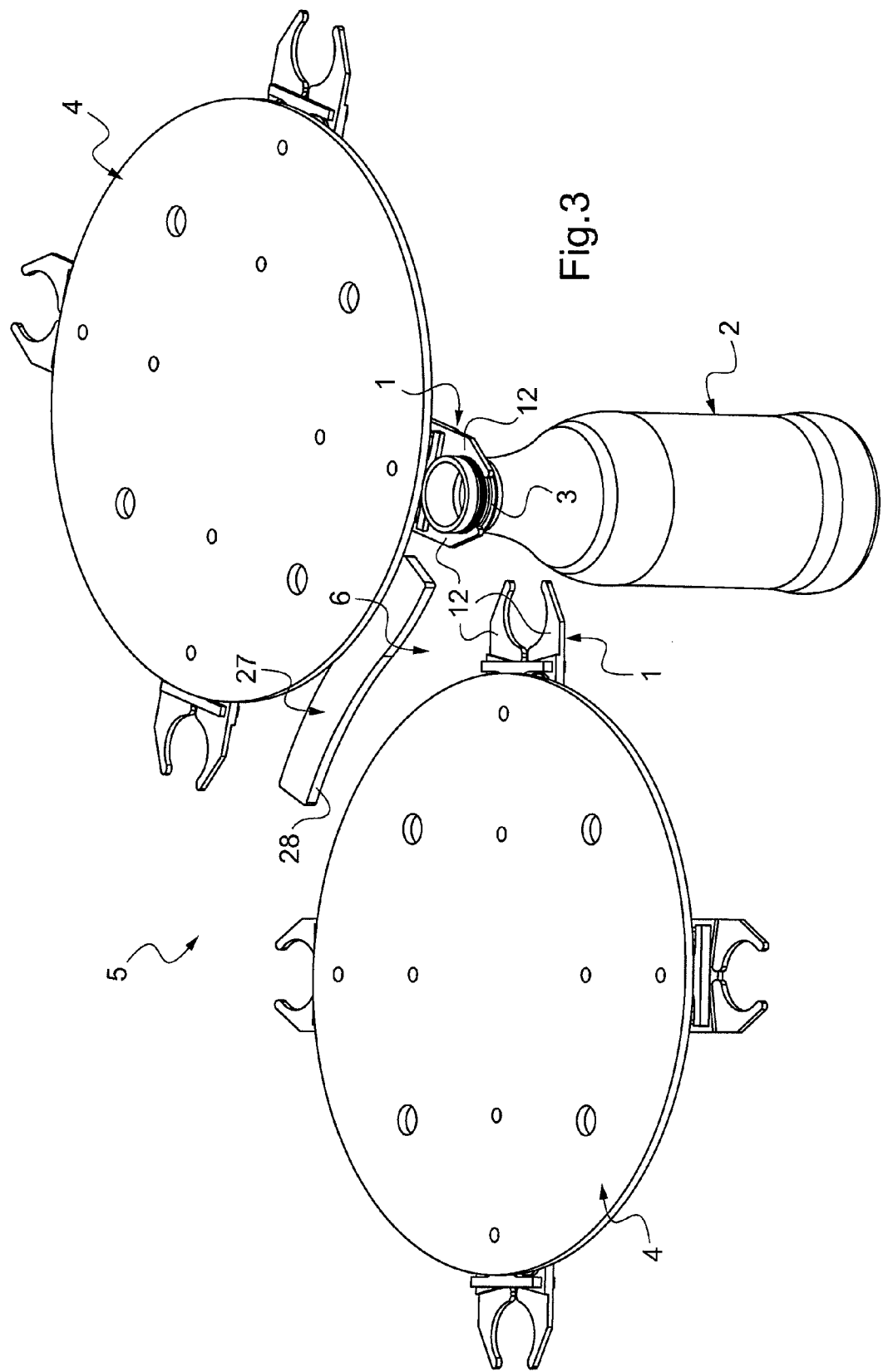

RESILIENT CLAMP FOR HOLDING A CONTAINER BY THE NECK

FIELD OF THE INVENTION

The invention relates to the field of container handling, and more precisely to a clamp for holding a container by a neck in a container handling machine.

BACKGROUND OF THE INVENTION

Plastic containers, and especially plastic bottles, have a neck the dimensions of which are precisely defined and remain unchanged during the manufacturing operations. Most handling machines include transfer devices such as transfer wheels provided at their periphery with a plurality of neck grippers or clamps configured to receive and hold the containers by their necks.

There exist several types of clamp designs. According to the most common design, the clamp comprises a pair of arms hinged with respect of each other, the angular position of which is controlled e.g. by cam means including a fixed cam path interacting with a movable cam follower provided on one of the arms, in such a way that when reaching a loading point the arms open to allow a container neck to be received therebetween. A compression spring is interposed between the arms to bias them towards each other against the opening force exerted by the cam means. For further details, one can refer to European patent application No. EP 1 867 600 (Sidel). Such a design has been in use in the container handling industry for years, and has given proof of its precision and smooth operation.

However, clamps of that type have drawbacks, due to the important number of numerous moving parts they include, which not only increases their manufacturing costs and their setting time, but also creates problems of reliability due to wear and setting defaults.

Therefore, alternate designs have been sought. One solution consists in providing a one-piece clamp having resilient arms, which elastically open under pressure of a container neck being received radially during a transfer operation. In theory, such a clamp, disclosed in Japanese patent application No. JP 2001-287795 (Masaaki), seems to overcome the drawbacks of the ordinary clamps, for it is no more necessary to provide cam or other means to positively open the arms in order to allow reception of the container necks. In practice however, such a clamp proves to give satisfaction in static conditions only, i.e. when the container is received radially between the arms, that is along the axis of symmetry of the clamp. Transfer devices do not work that way, though, for containers move along arc-of-circle paths and are transferred from one clamp to another in a tangential way, in a transfer area where the periphery of the two adjacent star wheels locally overlap. More precisely, as the arms are not open when they come in contact with the container neck, the distance between the gripping jaws of the arms at the radial end thereof may be too short for the container to smoothly and easily force its way between the arms. The skilled person may increase that distance, which can be achieved by reducing the angular opening of each gripping jaw. However such a solution is not satisfactory because, on the other hand, the angular opening of each gripping jaw should be set a maximum value to ensure sufficient—and therefore safe—enclosure of the container during its arc-of-circle path on the transfer wheel, along which path strong centrifugal forces apply, which tend to force the container out of the clamp.

One further and common drawback of the hereabove disclosed clamps of both types is that they do not (at least, not easily) adapt to several container formats, i.e. to different diameters of container necks. In particular, should the clamp according to Japanese patent application No. JP 2001-287795 receive a neck of a diameter larger than the one depicted on the drawings, would the clamp open at such an angle to let the container escape therefrom under the centrifugal forces during rotation of the transfer wheel.

SUMMARY OF THE INVENTION

It is therefore an object of the invention to provide a clamp of the one-piece type, having enough resilience to allow smooth clipping of a container neck during the transfer operations.

It is another object of the invention to provide a clamp of the one-piece type, suitable for safely gripping containers of different formats.

One aspect of the proposed solution is a clamp for holding a container by a neck in a container handling machine, said clamp comprising a body for mounting the clamp on a rotary support, and a pair of resilient arms protruding sidewise from the body and each provided with a gripping jaw, wherein each resilient arm comprises:
  an inner section extending along the body and connected thereto at a first back end junction;
  an intermediate section extending substantially parallel to the inner section and connected thereto at a front end junction;
  an outer section extending substantially parallel to the intermediate section and connected thereto at a second back end junction,
  and wherein the gripping jaws are provided at respective front ends of the outer sections.

In a preferred embodiment, the front end junction of the resilient arm is loop-shaped, and may extend over an arc of a circle, e.g. of constant radius of curvature. In this arc of circle, the front end junction is preferably of constant thickness. In addition, the front end junction may project partly inwardly with respect of the inner section.

The second back end junction may also be loop-shaped. It may include, successively:
  a first, arcuate portion, which may have a variable thickness and project backward and inwardly with respect of the inner section;
  a second, arc-of-circle portion, which preferably extends over a 180° angle and may have a variable thickness;
  a third, substantially straight portion, which may have a variable thickness.

The first back end junction preferably has an inclined surface defining a recess at a back end of the body.

According to another aspect, the invention provides an article transfer device equipped with a plurality of clamps as disclosed hereabove and, according to a further aspect, an article handling machine including one or more such article transfer devices.

The above and other objects and advantages of the invention will become apparent from the detailed description of preferred embodiments, considered in conjunction with the accompanying drawings.

BRIEF DESCRIPTION OF THE DRAWINGS

FIG. 1 is a perspective view showing a clamp according to the invention.

FIG. 2 is a planar view showing the clamp of FIG. 1, in a rest position.

FIG. 3 is a top perspective view showing part of a container handling machine including two adjacent transfer wheels including at their periphery a plurality of clamps for holding containers by their necks.

DESCRIPTION OF PREFERRED EMBODIMENTS

Figure 4:
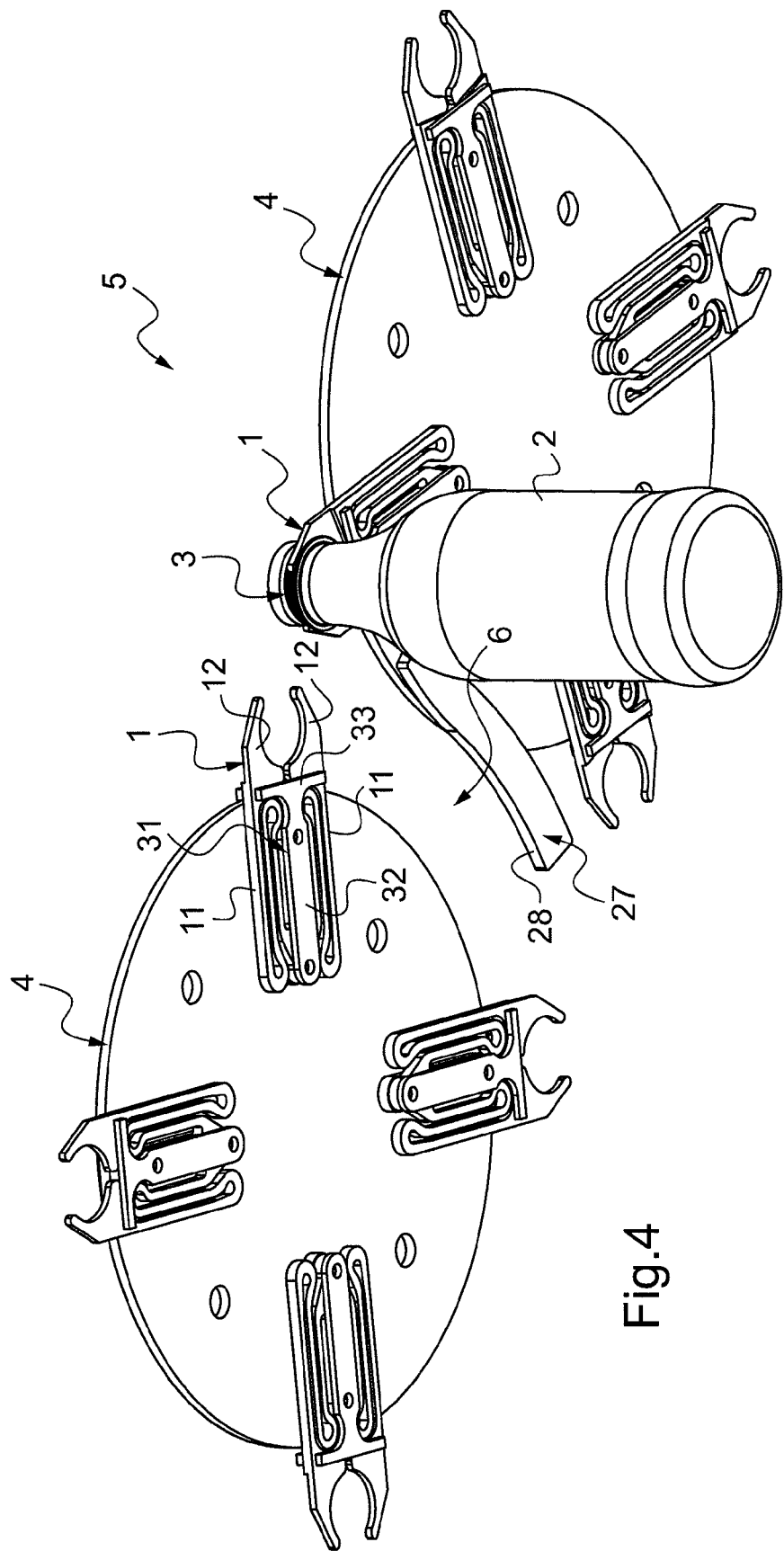
FIG. 4 is a bottom perspective view showing the container handling machine of FIG. 3.

Turning now to the drawings, there is represented on FIG. 1 and FIG. 2 a clamp 1 for gripping and holding a container 2 by a neck 3. The clamp 1 is to be mounted at the periphery of a rotary container transfer device 4 of a container handling machine 5, such as a star wheel, as depicted on FIG. 3-7. More specifically, two adjacent star wheels 4 equipped with such clamps 1 are represented on FIG. 3-7, which rotate in conjunction and define arc-of-circle transfer paths converging in a transfer area 6 where the clamps 1 locally overlap to ensure proper transfer of the containers 2 from one star wheel 4 to the adjacent one. Operation of the star wheels 4 will be further disclosed hereinafter.

The clamp 1 is one-piece and made of a metallic or plastic material, such as stainless steel or resistant resin. The clamp 1 comprises an elongated central body 7 provided with a pair of holes 8 receiving screws for removably mounting the clamp 1 at the periphery of a star wheel 4. The body 7 presents a front end portion 9, and a back end portion or tail 10.

As can be seen on FIG. 2, the clamp 1 presents mirror symmetry with respect of a central plane, and comprises a pair of resilient arms 11 protruding sidewise from the body 7, each provided with a gripping jaw 12.

Each lateral arm 11 is zigzag shaped and comprises three successive straight sections 13, 14, 15 which, in a rest state of the clamp 1 wherein no external stress is applied thereto (as depicted on FIG. 2), are substantially parallel to each other and to the body 7, i.e.:
- an inner section 13 extending along the body 7 at a predetermined distance therefrom, the inner section 13 having a first, transversal, predetermined thickness and being connected to the tail 10 at a first transversal back end 16 junction;
- an intermediate section 14 extending substantially parallel to the inner section 13 at a predetermined distance therefrom and connected thereto at a front end 180° loop junction 17, the intermediate section 14 having a second, transversal, predetermined thickness;
- an outer section 15 extending substantially parallel to the intermediate section 14 at a predetermined distance therefrom and connected thereto at a second back end 180° loop junction 18, the outer section 15 having a third, transversal, predetermined thickness.

As represented on FIG. 2, the gripping jaws 12 are provided at respective front ends of the outer sections 15, from which they protrude inwardly beyond the inner section 13 and intermediate section 14.

Each gripping jaw 12 includes an inner, cylindrical, contact surface 19 configured to cooperate with (i.e. to fit tightly around) a container neck 3, and an upper, planar, contact surface 20 configured to cooperate with a lower annular surface provided on the neck 3 to hold the container 2 all along the transfer path.

Figure 9:
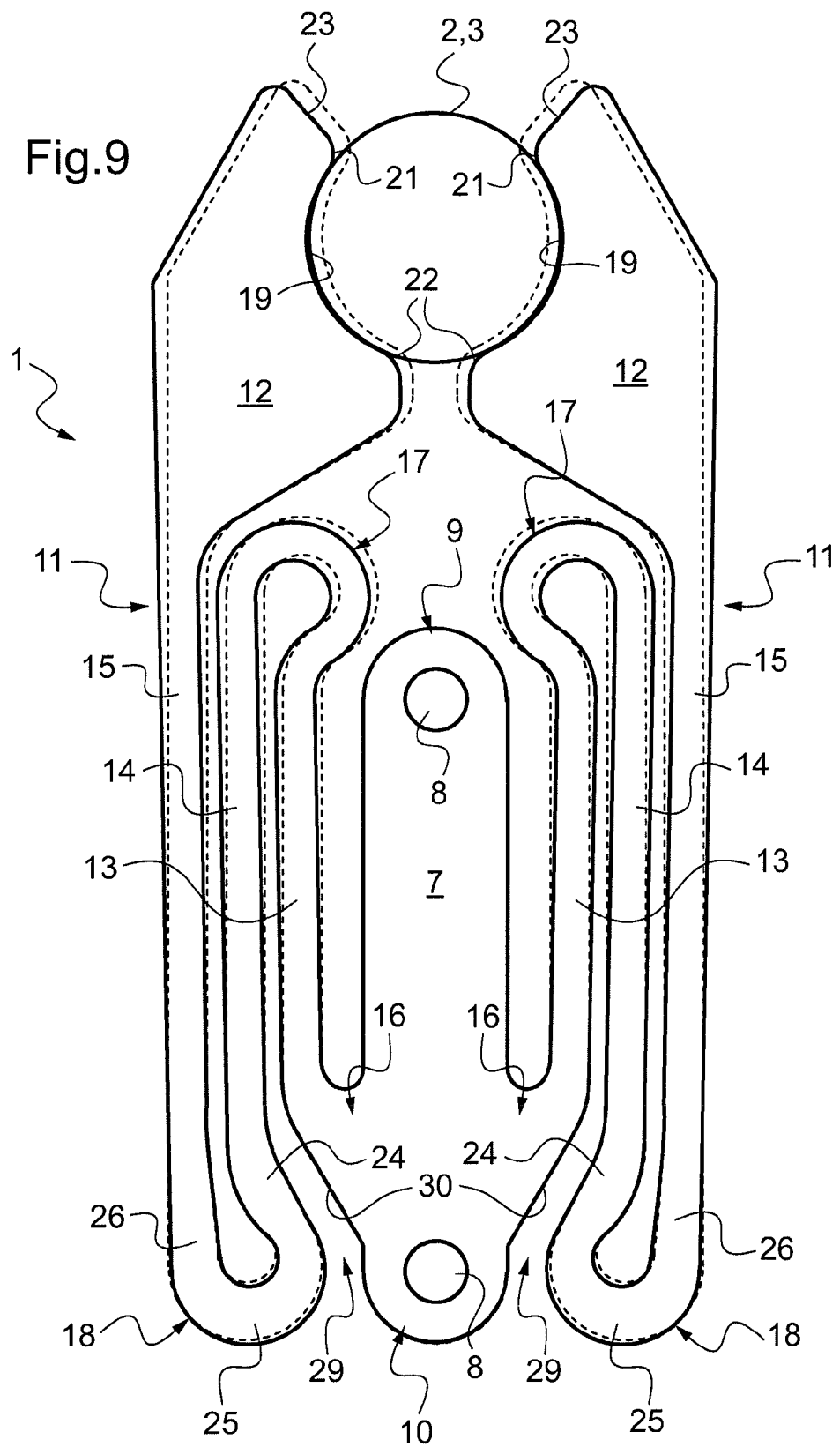
FIG. 9 is a view similar to FIG. 8, showing the clamp holding the container neck.
Figure 11:
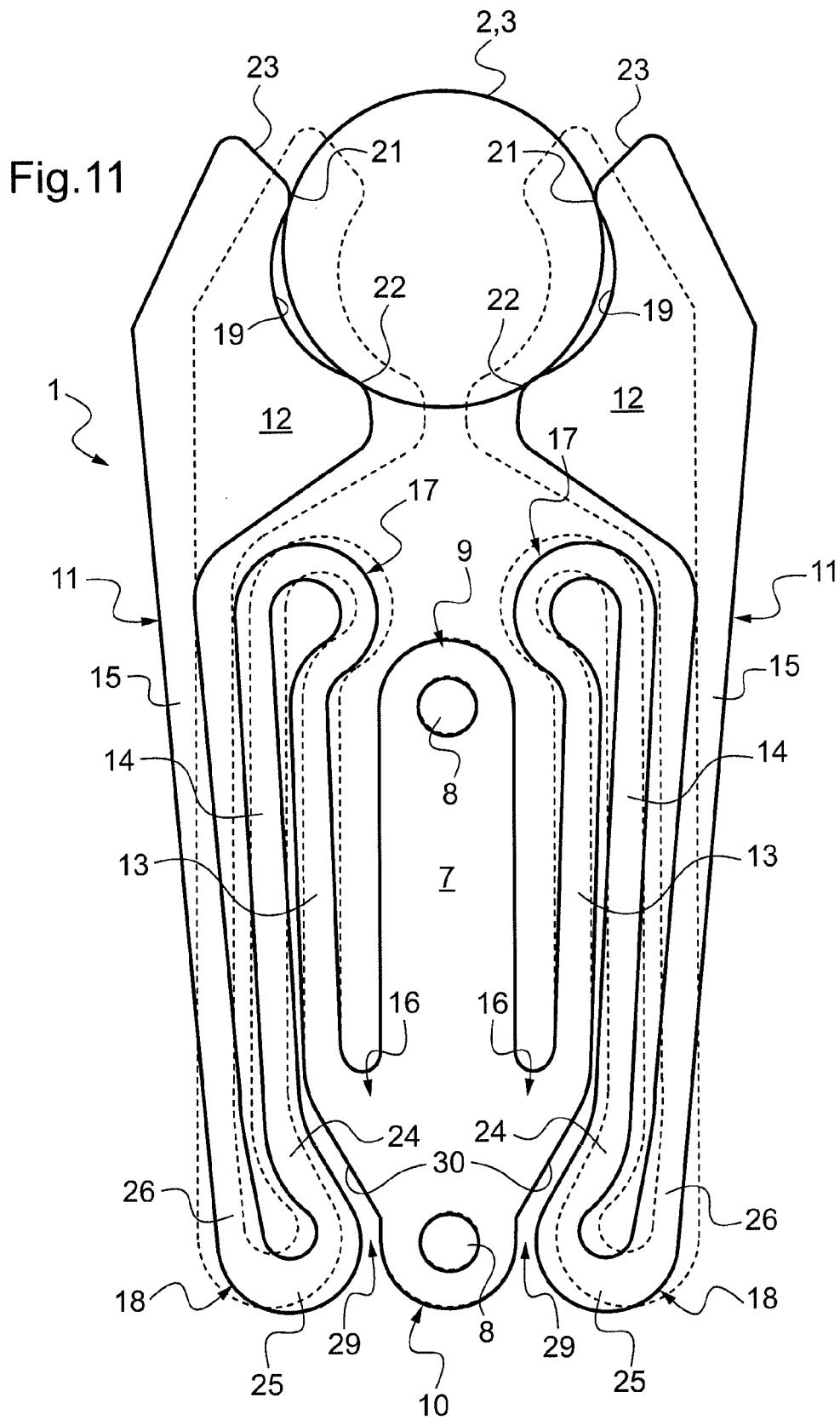

The inner contact surface 19 has a radius of curvature corresponding to a first, small, container format (i.e. neck diameter). The inner contact surface 19 is limited by a pair of rounded chamfers, i.e. a front chamfer 21 provided at a front end of the gripping jaw 12 to facilitate smooth clipping and release of the container neck 3 during loading and unloading operations, and a back chamfer 22 provided at a back end of the gripping jaw 12. As depicted on FIG. 2, the angular aperture of each inner contact surface 19 is of about 120°, and the transversal distance between the front chamfers 21, and respectively the transversal distance between the back chamfers 22, of the facing jaws 12, are both lower than the maximum distance between the inner contact surfaces 19. Accordingly, when the container 2 neck held between the jaws 12 is of the smaller format, its diameter taken transversely is fully surrounded by each inner contact surface 19 (FIG. 9), whereas when the container 2 is of a larger, maximum format, its diameter taken transversely is comprised between the rounded chamfers 21, 22 of the gripping jaws 12 which therefore act as contact and retaining areas for the container neck 3 (FIG. 11). In addition, each gripper jaw 12 presents, at a front end, an inclined guiding 23 surface against which the container neck 3 slides during its reception within the clamp 1.

In a preferred embodiment represented on FIG. 2, the front end loop junction 17 extends over an arc of a circle of substantially constant radius of curvature and of constant thickness, and partly projects inwardly with respect of the inner section 13, beyond the front end portion 9 of the body 7.

The back end loop junction 18 comprises three successive portions, namely:
- a first, arcuate portion 24, the thickness of which is variable (it is first increasing and then decreasing), connected to the inner section 13 and projecting backward and inwardly with respect thereof,
- a second, arc-of-circle portion 25 extending over a 180° angle starting from the first portion 24, and the thickness of which is variable: first increasing and then decreasing,
- a third, substantially straight portion 26, the thickness of which is slightly decreasing starting from the second portion 25 to the outer section 15 of the arm 11.

Accordingly, the inner section 13 is hinged with respect of the central body 7 about the first back end junction 16; the intermediate section 14 is hinged with respect of the inner section 13 about the front end loop junction 17; and the outer section 15 is hinged with respect of the intermediate section 14 about the back end loop junction 18.

The clamp 1 is therefore designed to undergo a predetermined elastic distortion under the radial pressure exerted by a container neck 3 received within the clamp 1 at the transfer area 6.

Figure 5:
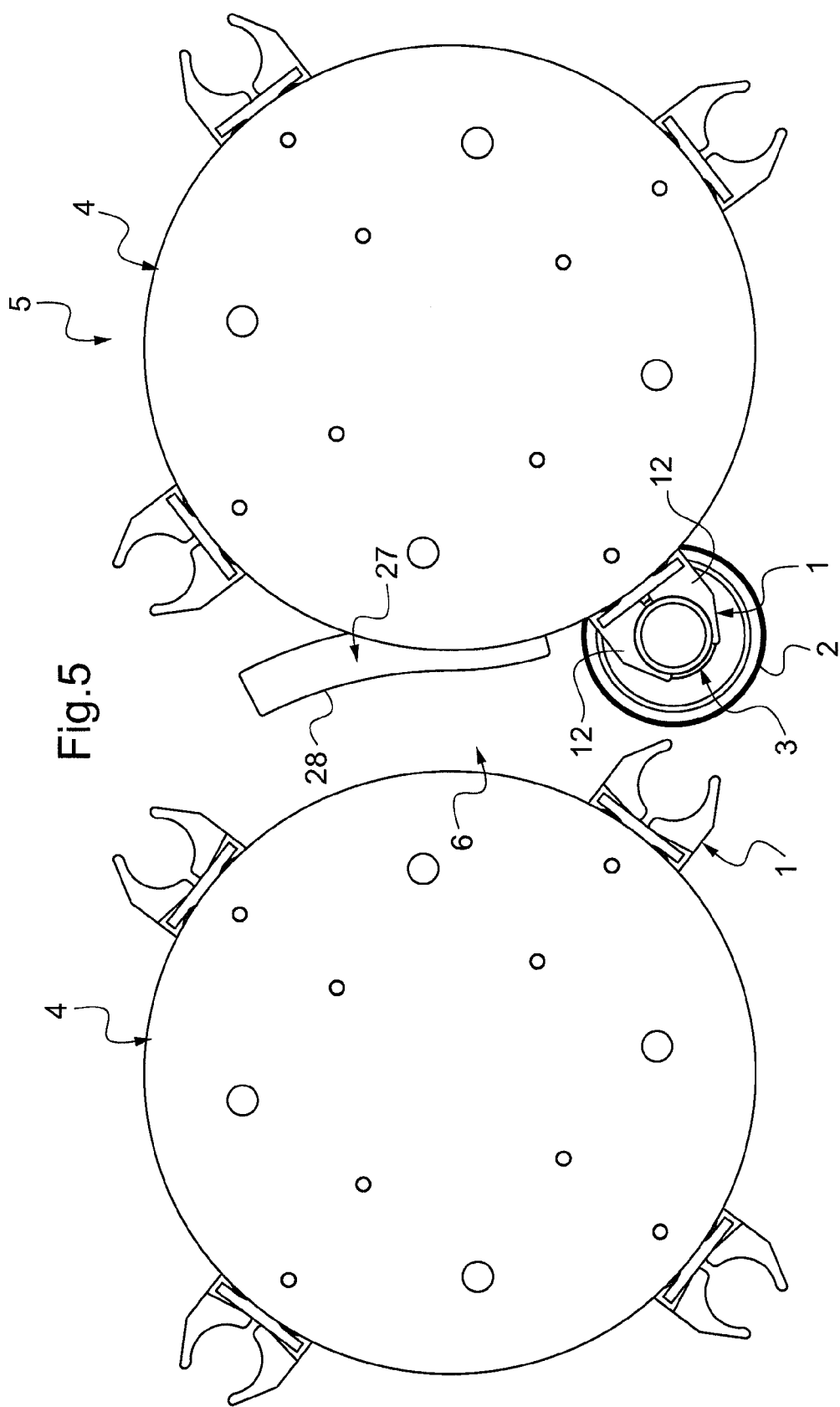
FIG. 5-7 are planar top views showing the machine of FIG. 1, illustrating a sequence of transferring a container from one transfer wheel to the other.
Figure 6:
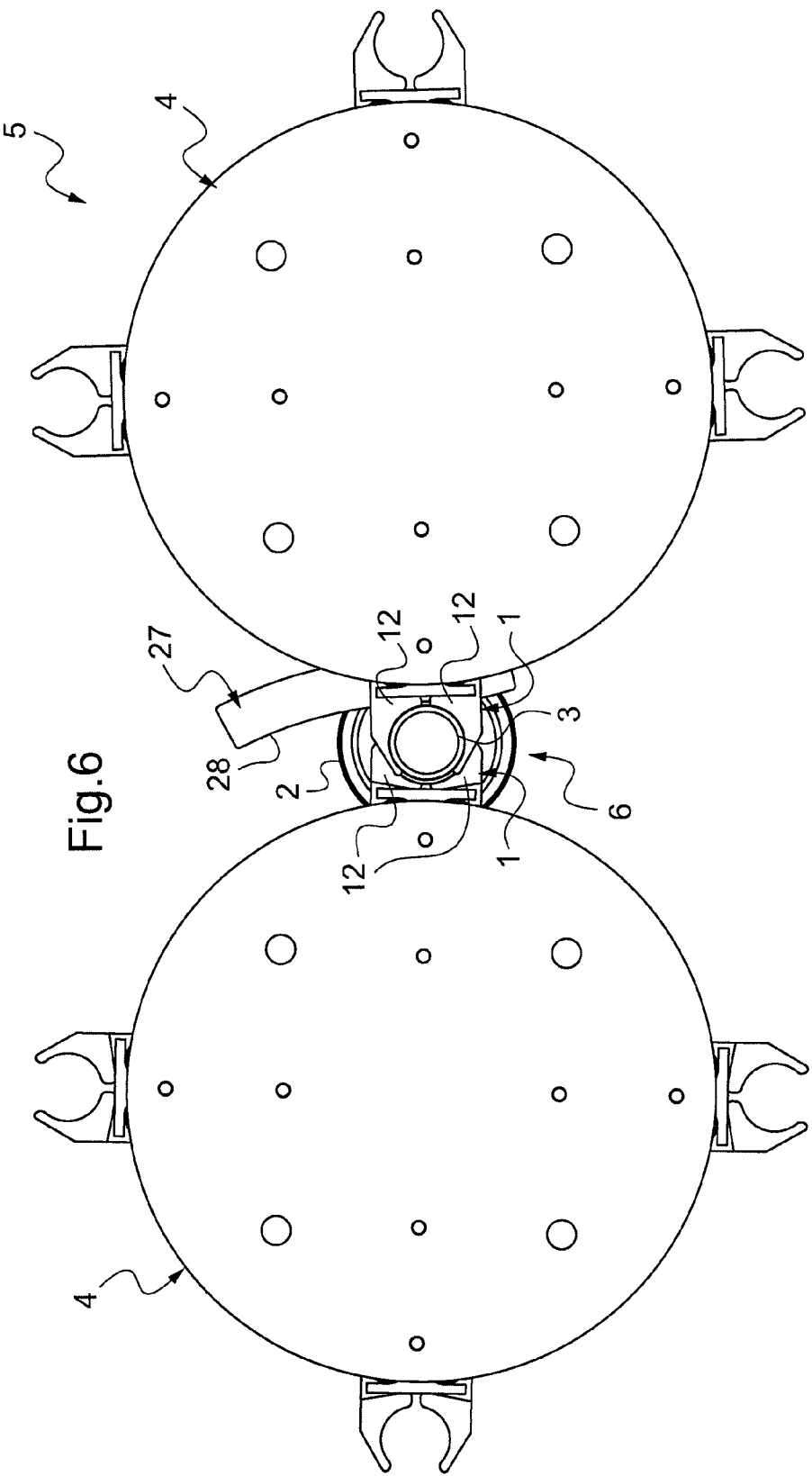

Starting from an initial position depicted on FIG. 3-5, on which a container 2 is held by a first clamp 1 provided at the periphery of a first star wheel 4 (located on the right on FIG. 3-7), the first star wheel 4 and the second star wheel 4 (located on the left on FIG. 3-7) both rotate in conjunction around their central axis, respectively clockwise and counterclockwise (from the top point of view of FIG. 5).

Figure 7:
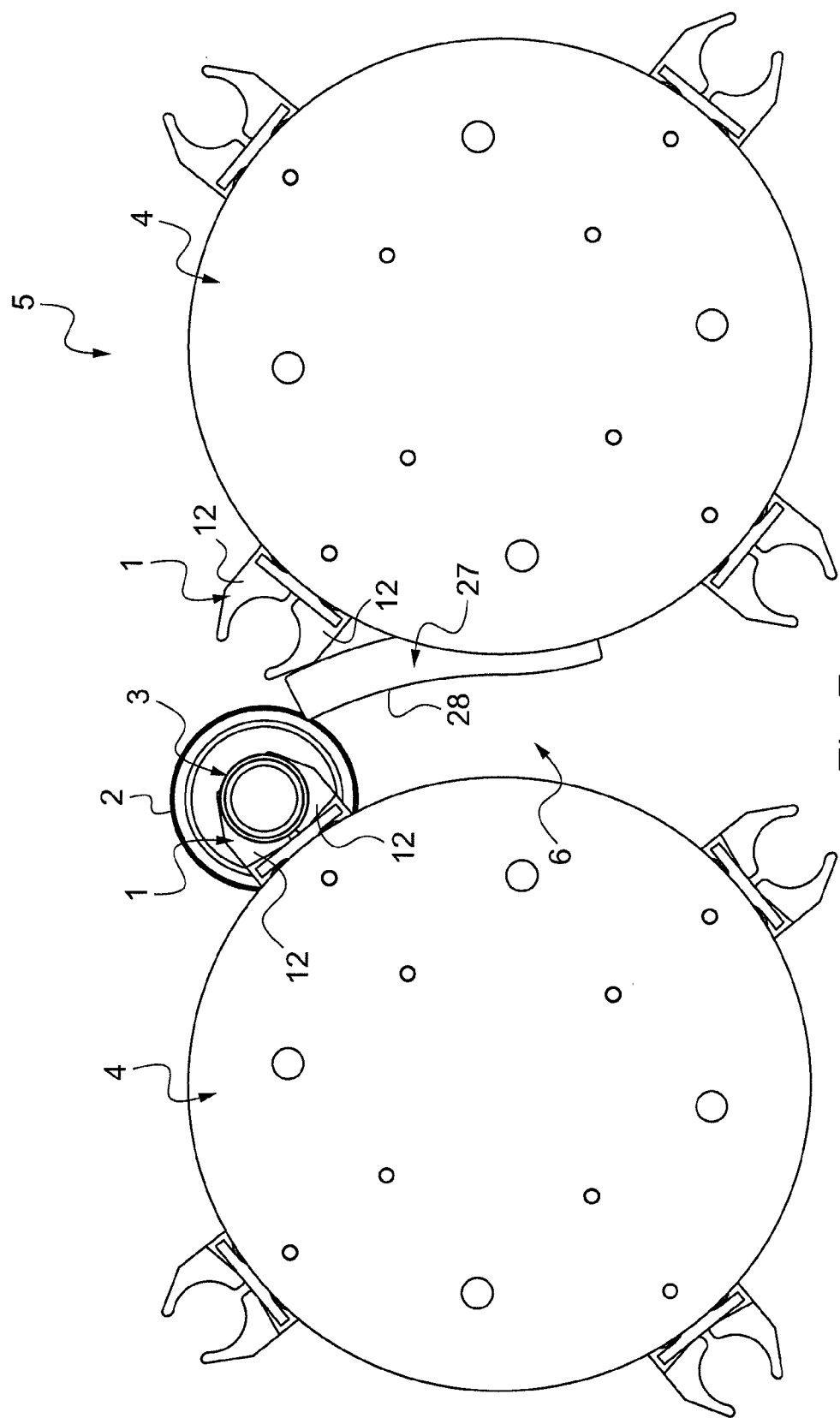

When the first clamp 1, holding the container 2, together with a corresponding second clamp 1 provided at the periphery of the second star wheel 4, both reach the transfer area 6, where the clamps 1 locally overlap, the container 2 is released by the first clamp 1 and simultaneously transferred to the second clamp 1. In order to facilitate transfer, the machine 5 includes a fixed extraction guide 27, provided at the periphery of the first wheel 4 in the transfer area 6 and including an arcuate contact surface 28 diverging from the circular path of the first clamp 1 and against which the container 2 slides to be forced out of the first clamp 1, whereby the container 1 is released therefrom and clipped within the second clamp 1 (FIG. 7).

Figure 10:
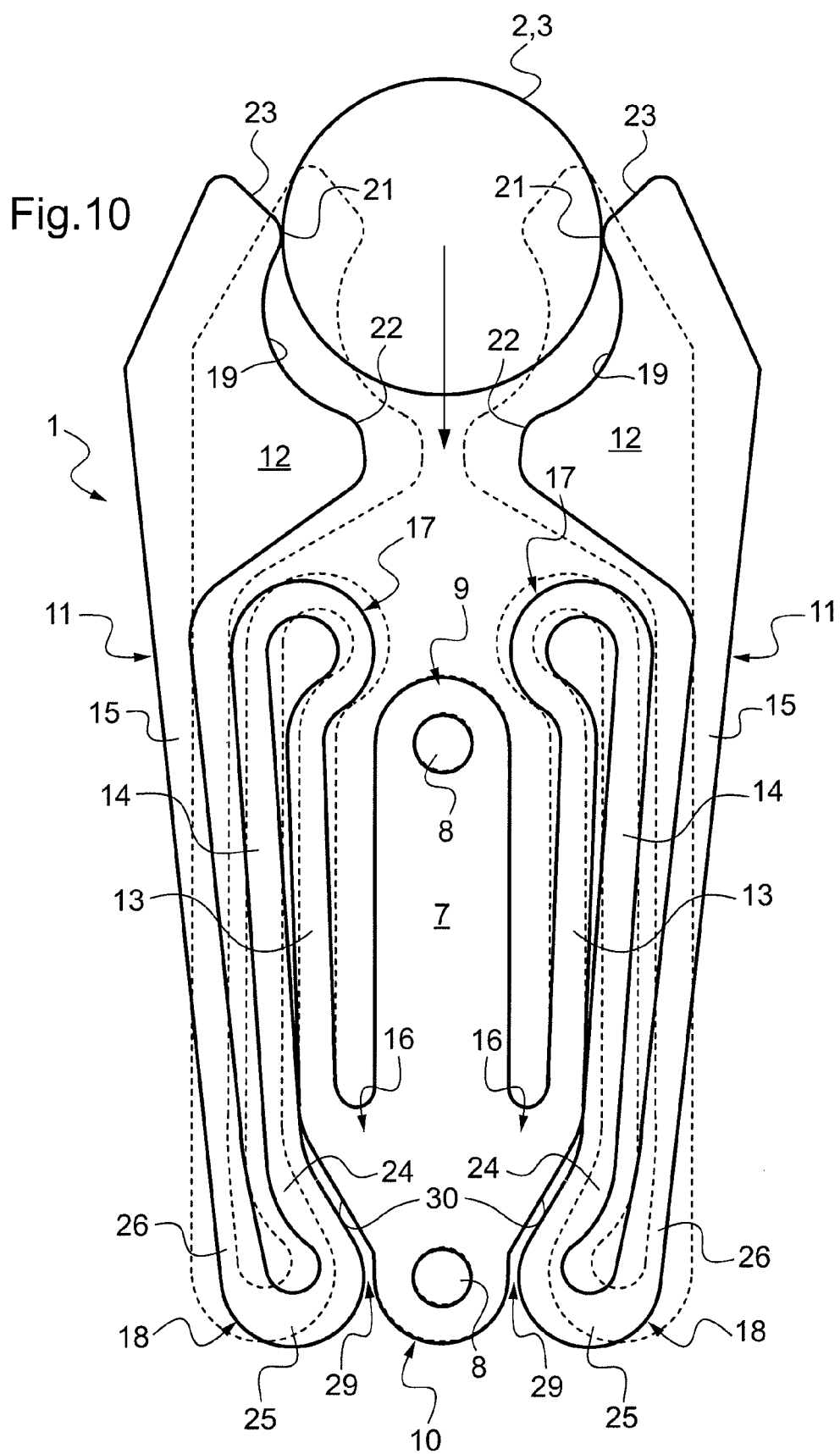
FIG. 10 and FIG. 11 are views similar to FIG. 8 and FIG. 9, respectively, wherein the container neck presents a larger diameter.

FIG. 8-11 show in details the behavior of the clamp 1 during the transfer operations, respectively for a smaller container format (FIG. 8-9), the radius of which corresponds to the radius of curvature of the inner contact surface 19 of the gripping jaws 12, and for a larger container format (FIG. 10-11). On FIG. 8-10, the rest position of the clamp 1 is represented in dashed line, to better show distortion of the clamp 1 during the container transfer.

Figure 8:
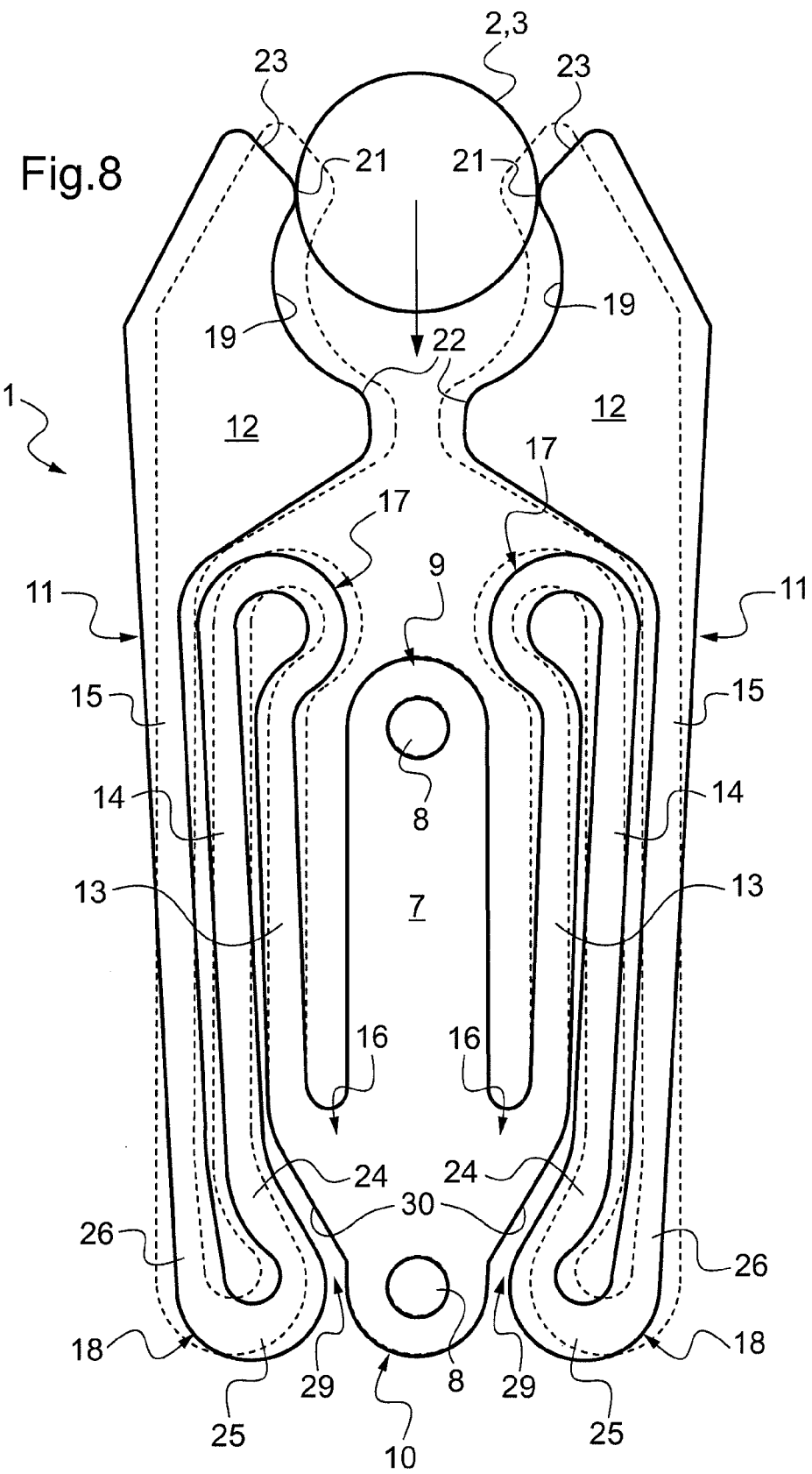
FIG. 8 is a planar schematic view showing the clamp of FIG. 2, receiving a container neck presenting a first diameter.

The container neck 3 is received radially within the jaws 12 as indicated by the arrows of FIG. 8 and FIG. 10. At first, the container neck 3 slides against the guiding surfaces 23, whereby the container neck 3 exerts on the jaws 12 a combined force including both a radial component and a transversal component. Accordingly, the arms 11 undergo a combined lateral and backwards displacement. More specifically, considering the right arm 11 of the clamp on FIG. 8, from a top point of view:

the outer section 15 rotates clockwise about the back end loop junction 18,
the intermediate section 14 rotates clockwise about the front end loop junction 17;
the inner section 13 rotates clockwise about the back end junction 16.

As a consequence:
the front end loop junction 17 undergoes circular motion clockwise about the back end junction 16;
the back end loop junction 18 undergoes a combined inward and backward motion.

Inward motion of the back end loop junction 18 may be facilitated by a recess 29 formed on both sides of the tail 10 by an inclined surface 30 of the back end junction 16. As depicted on FIG. 10, depending on the container neck format, the intermediate section 14 may abut laterally against the back end junction 16, yet without preventing the combined lateral and backward movement of the gripping jaws 12 from going on.

The presence of the three successive centers of rotation, namely the back end junction 16, the front end loop junction 17 and the back end loop junction 18, amplify the backward movement of each gripping jaw 12. Accordingly, the arms 11 act radially as a buffer spring for the container neck 2 during transfer, thereby providing radial clearance in the transfer area 6 between the transfer wheels 4. Container transfer is therefore facilitated whichever the container format (to be chosen between the smaller one and the larger one).

Resilience of the clamp 1 may be set by the choice of its dimensions. More specifically, the skilled person may choose the length and thickness of the arm sections 13, 14, 15 and the distance therebetween, the distance between the inner section 13 and the central body 7, and also the thickness and angular aperture of the junctions 17, 18. Thinning the junctions 17 and 18 would increase flexibility of the arms 11. On the contrary, thickening the junctions 17 and 18 would increase rigidity of the arms 11.

In a preferred embodiment, the clamp 1 may be manufactured through laser cut from a metallic plate the thickness of which is to be chosen by the skilled person according to the desired resilience. It should be considered that the thinner the clamp 1, the less resistant it is in a vertical direction. Precisely in order to avoid vertical distortion of the clamp 1, in other words to maintain the arms 11 in the same, horizontal, plane, each clamp 1 may be sandwiched to the transfer wheel 4 by means of a T-shaped stiffener plate 31 having an axial central portion 32 covering the body 7 of the clamp 1, and a front, transversal portion or head 33, which partly covers the gripping jaws 12 so as to ensure planar movement thereof (see FIG. 4).

The invention claimed is:

1. Clamp for holding a container by a neck in a container handling machine, said clamp comprising:
   a body for mounting the clamp on a rotary support; and
   a pair of resilient arms protruding sidewise from the body and each provided with a gripping jaw,
   wherein each resilient arm comprises:
   an inner section extending along the body and connected thereto at a first back end junction;
   an intermediate section extending substantially parallel to the inner section and connected thereto at a front end junction;
   an outer section, provided, at a front end, with a gripping jaw, and extending substantially parallel to the intermediate section and connected thereto at a second back end junction.

2. Clamp according to claim 1, wherein the front end junction is loop-shaped.

3. Clamp according to claim 2, wherein the front end junction extends over an arc of a circle.

4. Clamp according to claim 3, wherein said arc of a circle is of constant radius of curvature.

5. Clamp according to claim 3, wherein, in said arc of circle, the front end junction is of constant thickness.

6. Clamp according to claim 1, wherein the front end junction partly projects inwardly with respect of the inner section.

7. Clamp according to claim 1, wherein the second back end junction is loop-shaped.

8. Clamp according to claim 7, wherein the second back end junction successively includes:
   a first, arcuate portion;
   a second, arc-of-circle portion;
   a third, substantially straight portion.

9. Clamp according to claim 8, wherein the arcuate portion has a variable thickness.

10. Clamp according to claim 8, wherein the arcuate portion projects backward and inwardly with respect of the inner section.

11. Clamp according to claim 8, wherein the arc-of-circle portion extends over a 180° angle.

12. Clamp according to claim 8, wherein the arc-of-circle portion has a variable thickness.

13. Clamp according to claim 8, wherein the straight portion has a variable thickness.

14. Clamp according to claim 1, wherein the first back end junction has an inclined surface defining a recess at a back end of the body.

15. Article transfer device equipped with a plurality of clamps according to claim 1.

16. Article handling machine including one or more article transfer devices according to claim 15.

17. Clamp according to claim 1, wherein the gripping jaw is located a front end of the clamp.

18. Clamp according to claim 1, wherein the body has an elongated shape having a front end portion and a back end portion, which are mounted to the rotary support.

\* \* \* \* \*